Dec. 29, 1953
C. J. GILBERT
2,663,947
THREAD GAUGE
Filed Nov. 22, 1949
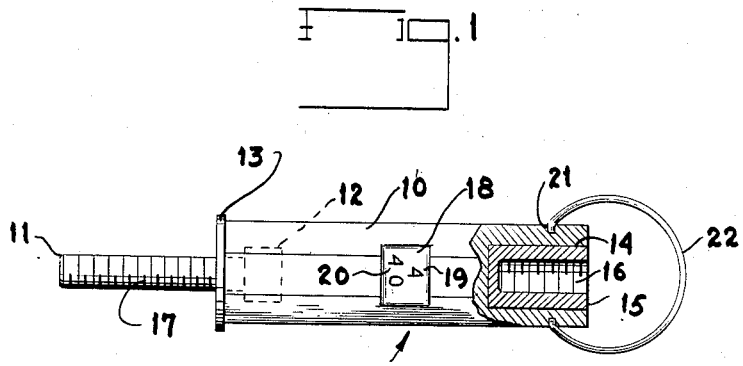
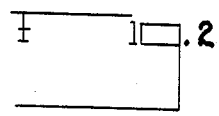
INVENTOR.
Clifford J. Gilbert
BY Joshua R. H. Potts
His Attorney Patented Dec. 29, 1953

2,663,947

UNITED STATES PATENT OFFICE 2,663,947

THREAD GAUGE

Clifford J. Gilbert, Philadelphia, Pa.

Application November 22, 1949, Serial No. 128,788

2 Claims. (Cl. 33—199)

The present invention relates to thread gauges and is concerned primarily with a gauge that is adapted for use with either a tapped hole or a screw stem.

At the present time mechanics and workmen who deal with screws are often confronted with the necessity of determining just what screw will fit in a tapped hole or the exact nature of a threaded screw stem. With the now available devices a mechanic must first try out several screws in a tapped hole until one accurately fits the hole. He must then take this screw and measure its diameter by using calipers and determine the number of threads per unit length by employing the gauges which are available for this purpose. Obviously, this is a complicated mode of procedure which is intended to be obviated by the present invention.

Likewise, if a mechanic has a screw stem the structural characteristics of which are unknown, it is necessary for him to measure its diameter by using calipers or comparable measuring instrument and then employ the now available thread gauge for determining the number of threads per unit length.

With the foregoing conditions in mind, the present invention has in view as its foremost objective the provision of a thread gauge which comprises a handle from which extends a threaded shank with the handle carrying indicia which indicate the diameter of the shank and the number of threads per unit length of the shank.

When a set of such gauges is employed, an operator may try several of the threaded shanks in a tapped hole. Once an accurate fit is achieved, the mechanic is immediately advised of the diameter and number of threads per inch of the screw which will fit in that tapped hole, because these indicia are carried on the handle which is attached to the threaded shank.

Still another object of the invention is to provide in a thread gauge of the type indicated, an insert having a threaded bore. This threaded bore is located at the end opposite to that which carries the threaded shank, and this threaded bore has the same diameter as the threaded shank and also the same number of threads per unit length. Thus, the indicia on the handle also designate the characteristics of a screw which will fit in the threaded bore. Hence, if an operator has a screw of unknown characteristics he tries this screw in several of these sockets until an accurate fit is achieved. Once this fit is obtained, the indicia on the handle immediately indicate the diameter of the screw and the number of threads per unit length.

Still another object of the invention is to provide a gauge of the character indicated which is provided with a bail at one end that is adapted to suspend the gauge from a hook or similar supporting element. The handle of the gauge carries the indicia in such a manner that they are readily readable with the gauge in a suspended position. Thus, a set of the gauges may be suspended from a row of hooks and a mechanic can quickly pick out any particular gauge because the indicia are displayed in a manner which facilitates its reading.

Various other more detailed objects and advantages of the invention, such as arise in connection with carrying out the above noted ideas in a practical embodiment, will in part become apparent and in part be hereinafter stated as the description of the invention proceeds.

The invention therefore comprises a thread gauge which consists essentially of a handle having a threaded shank extending from one end and an insert formed with a threaded bore at the other end, with the shank and bore having the same diameter and number of threads per unit length, which are designated with indicia on the handle. The handle is provided with a bail for suspending purposes and the indicia are arranged for easy reading while the gauge is suspended.

For a full and more complete understanding of the invention, reference may be had to the following description and accompanying drawing, wherein:

Figure 1 is a side view, mostly in elevation but with parts broken away and shown in section, of a thread gauge designed in accordance with the precepts of this invention; and Figure 2 is an illustration of a chart which may be employed in conjunction with a set of the gauges illustrated in Figure 1.

Referring now to the drawing and, first, more particularly to Figure 1, a thread gauge which is designed in accordance with the precepts of this invention is therein illustrated and is referred to in its entirety by the reference character T. The gauge T includes as an essential element a handle indicated at 10 which may be made from any appropriate material. The invention has particularly in mind the use of a yellow or similarly colored plastic which is now meeting with widespread use as a material from which the handles of screw drivers and similar tools are formed.

The handle 10 may be of any cross-sectional area desired, although in a preferred form of the invention it will be non-circular so as to facilitate rotative manipulation. As shown in Figure 1, the handle 10 is hexagonal in cross-section.

Extending outwardly from one end of the handle 10 is a threaded shank 11. This shank may include a head such as is indicated by the broken lines at 12, which is imbedded in the handle 10. Thus, the handle 10 might be cast or molded about the threaded shank 11. Between the shank 11 and handle 10 there is a guard plate or shield 13 which abuts the end of the handle 10.

At the end remote from that which carries the shank 11 the handle 10 is formed with a socket 14 in which is fitted a metallic insert 15. This metallic insert is threaded as shown in 16 and the socket has the same number of threads per unit length as do the threads 17 of the shank 11. It is also notable that the diameter of the socket 16 is the same as the diameter of the shank 11.

The handle 10 is provided with indicium for designating the diameter of the shank 11 and the bore of the insert 15, and also with indicium for indicating the number of threads per unit length. These indicia may be displayed in any preferred manner, although the invention has particularly in mind an arrangement such as illustrated in Figure 1, wherein the handle is cut away to provide a panel 18 on which the indicia are inscribed. With the handle 10 suspended in a vertical position, the uppermost number such as that reached at 19, designates the diameter of the shank 11 and the bore of the insert 15, while the lowermost number 20 indicates the number of threads per unit length.

The handle 10 is formed with a bar of diametrically opposed sockets 21 adjacent to the end carrying the insert 15 and the ends of a bail 22 are received in these sockets 21 to establish a pivotal connection between the bail 22 and the handle 10. Obviously, this bail 22 may be employed to suspend the gauge from a hook, nail or similar support, with the handle 10 assuming a vertical position in which the indicia on the panel 18 are easily read.

Obviously, a set of the gauges T will be provided and the number of these gauges included in any particular set will be determined by the particular character of the work for which they are intended. Thus, one set of gauges which would be provided for an automobile mechanic would include a number of gauges which would be suitable for that particular line of work. These gauges would have shanks and sockets of the type ordinarily encountered in automotive work. Obviously, a set designed for radio and small appliance work would include gauges over a different size range.

Figure 2 illustrates a chart C, which displays a designation of the gauges which would be necessary for one complete set. The first column, which is headed by the designation NF, lists the characteristics of the gauges having the national fine threads; the second column, headed by the designation NC, lists the gauges having the national coarse threads. Each designation in each column corresponds to the indicia on one of the gauges of a set.

While the manner of using a set of the thread gauges above described is believed to be obvious from the description of the parts given, it is noted that under ordinary conditions a set of the gauges T will be suspended by the bails 22 from a row of hooks, in which position the indicia on the panels 18 are easily readable. Assume that the operator is confronted with a tapped hole and he is desirous of determining just what screw will fit that hole. By looking at the tapped hole the operator will be enabled to form an idea as to the approximate diameter of the hole. He selects a gauge having that diameter and attempts to screw the threaded shank 11 into the hole. At the first try the shank probably will not go in with the ease which indicates an accurate fit. However, upon repeated tries he will finally find a shank 11 which will screw in easily. He then merely looks at the indicia on the handle 10 and he is immediately advised of the diameter of the screw required, as well as the number of threads per unit length.

The same trial-and-error method is employed in determining the characteristics of a threaded shank. Once a screw is accurately fitted in the socket of the insert 15 the operator is immediately advised of the diameter of the screw and the number of threads per unit length.

It is important to note that the handle 10 should be fairly slender and not have a diameter sufficiently large to create any excessive torque in using the gauge. If such torque were created there might be a tendency of the shank 11 to damage the threads of the tapped hole which is being measured.

While a preferred specific embodiment of the invention is hereinbefore set forth, it is to be clearly understood that the invention is not to be limited to the exact constructions and devices illustrated and described because various modifications of these details may be provided in putting the invention into practice within the purview of the appended claims.

What is claimed is:

1. In a thread gauge, a metallic threaded shank having a head, an elongated handle of plastic having said head and a portion of said shank immediately adjacent thereto embedded therein, a metallic plate circumposed about said shank and engaging the adjacent end of said handle, said handle being formed with an exposed flat panel, indicia on said panel arranged for reading when said gauge is suspended in a vertical position, said indicia indicating the diameter of said shank and the number of threads per unit length thereon, and a bail at the end of said handle remote from said shank for suspending the gauge in a vertical position.

2. In a thread gauge, a metallic threaded shank having a head, an elongated plastic handle of polygonal cross section having said head and the portion of said shank immediately adjacent thereto embedded therein, a circular metallic plate circumposed about said shank and engaging the adjacent end of said handle, said handle being formed with an exposed flat panel, indicia on said panel arranged for reading with said gauge in a vertical position, said indicia indicating the diameter of said shank and the number of threads per unit length thereon, and a bail pivotally secured to the end of said handle remote from said shank for suspending said gauge in a verical position.

CLIFFORD J. GILBERT.

References Cited in the file of this patent

UNITED STATES PATENTS

| Number | Name | Date |
|---|---|---|
| 264,527 | Haley | Sept. 19, 1882 |
| 524,589 | Gruebel | Aug. 14, 1894 |
| 552,238 | Darling | Dec. 31, 1895 |
| 1,130,866 | Wells et al. | Mar. 9, 1915 |
| 1,294,004 | Weaver | Feb. 11, 1919 |
| 2,536,225 | Rice | Jan. 2, 1951 |
| 2,536,969 | Turner | Jan. 2, 1951 |

FOREIGN PATENTS

| Number | Country | Date |
|---|---|---|
| 42,396 | Sweden | Apr. 18, 1917 |
| 312,428 | Germany | May 27, 1919 |
| 197,014 | Switzerland | Oct. 1, 1938 |
| 234,142 | Switzerland | Dec. 16, 1944 |

OTHER REFERENCES

Stewart Screw and Nut Locator, 1 sheet, published by Stewart Mfg. Co., Washington, D. C.

Sheffield Gages, Bulletin No. fL-1-45, pages 12 and 13, published by the Sheffield Corpn., Dayton, Ohio.